United States Patent [19]

Seneff

[11] Patent Number: 4,805,297
[45] Date of Patent: Feb. 21, 1989

[54] APPARATUS FOR APPLYING FRAMES TO FABRIC

[76] Inventor: Robert W. Seneff, W224 N2829 Stonewood Ct., Waukesha, Wis. 53186

[21] Appl. No.: 108,885

[22] Filed: Oct. 16, 1987

[51] Int. Cl.⁴ .......................................... B23Q 16/12
[52] U.S. Cl. ...................................... 29/721; 29/251; 29/252; 248/176
[58] Field of Search ................ 29/721, 238, 251, 252; 248/285, 286, 124, 176

[56] References Cited

U.S. PATENT DOCUMENTS

| | | |
|---|---|---|
| 662,982 | 12/1900 | Stevens . |
| 1,294,713 | 2/1919 | Runnette . |
| 2,190,582 | 2/1940 | Wolf .......................................... 88/56 |
| 2,362,185 | 11/1944 | Brammer ............................... 29/235 |
| 2,533,870 | 12/1950 | Bayer ....................................... 81/7 |
| 2,753,897 | 7/1956 | Conrad ................................. 140/109 |
| 3,099,875 | 8/1963 | Lelis ...................................... 29/227 |
| 3,608,179 | 9/1971 | Jeffree et al. .......................... 29/446 |
| 3,705,454 | 12/1972 | Zuhlke .................................. 29/208 |
| 3,871,055 | 3/1975 | Dail ....................................... 29/267 |
| 3,874,058 | 4/1975 | Jesevich et al. ................... 29/208 D |
| 4,538,335 | 9/1985 | Moore, III ............................ 29/251 |
| 4,561,177 | 12/1985 | Rancer ................................... 29/721 |

FOREIGN PATENT DOCUMENTS 7805887  2/1979  Netherlands ......................... 248/176

OTHER PUBLICATIONS

IBM Technical Disclosure Bulletin, vol. 26, No. 7A, Dec. 1983, Grospin, Hassebrook and Shlatz.
"MacFrame Puts Tension in its Place . . ." flyer of Macpherson, Inc., P.O. Box 1889, Greensboro, N.C. 27402.
Impressions, vol. 10, No. 9, Jan. 1987, p. 168.

Primary Examiner—P. W. Echols
Assistant Examiner—Joseph M. Gorski
Attorney, Agent, or Firm—Quarles & Brady

[57] ABSTRACT

A machine for applying frames to fabric with the fabric accurately aligned with the frame. A work surface has blocks which are adjustable to position an outer frame along a line 45° to the front of the machine. An air cylinder is supported over the work surface by an arm which is slidably adjustable relative to a column which is rotatably adjustable to position the air cylinder relative to the outer frame. A pressure plate of the air cylinder holds an inner frame to be pressed into the outer frame. A laser light source is supported by the column so as to be directed to any desired position on the work surface to align the fabric with the outer frame.

7 Claims, 2 Drawing Sheets

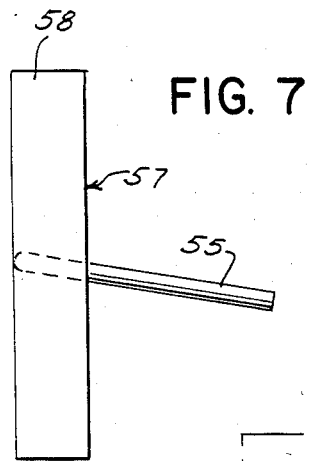
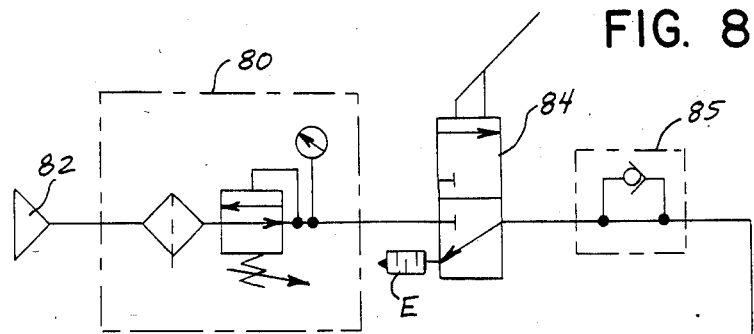
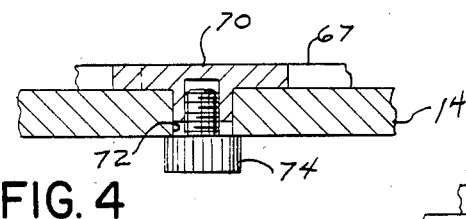
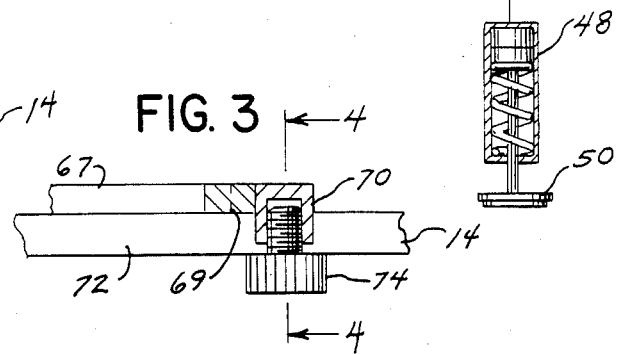
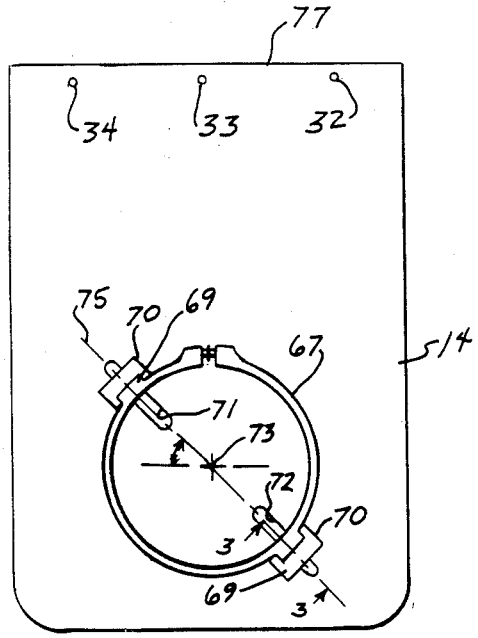
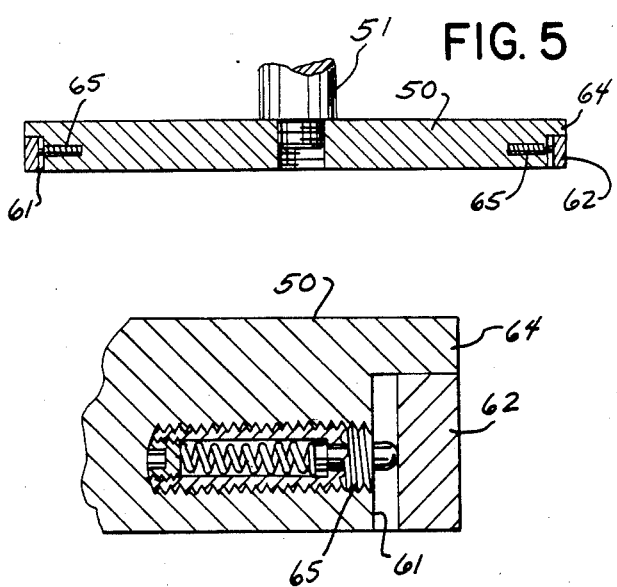

APPARATUS FOR APPLYING FRAMES TO FABRIC

BACKGROUND OF THE INVENTION

1. Field of the Invention

The invention relates to a machine for applying frames to abric, and in particular, to a machine for applying a hoop or other tensioning frame to fabric prior to embroidering or monogramming the fabric.

2. Discussion of the Prior Art

In the manufacture of clothing and other fabric products, it is sometimes necessary to apply a frame to the fabric either permanently or temporarily to hold the shape of the fabric and/or apply tension to the fabric. For example, it is necessary to temporarily apply a frame to the area of a piece of fabric that is to be embroidered to hold the fabric taught. The embroidery is then typically done on an automated embroidery machine and the frame is then removed.

One problem has been to align the area of the fabric which is to be framed, such as the area to be embroidered, in the frame. In the case of embroidery, if the area of the fabric is not aligned with the frame, the embroidery on the final product will be out of position. If it is far enough out of position, the entire product may have to be scrapped.

SUMMARY OF THE INVENTION

The invention provides an apparatus for applying a frame to fabric. The apparatus has a work surface supported by a stand and means supported by the stand above the work surface for applying the frame to fabric overlying the work surface. A laser supported by the stand emits a beam of visible light incident upon the fabric at a location predetermined to align the fabric with the frame. Thus, accurate and convenient alignment of the frame and fabric is achieved without a clumsy or inconvenient apparatus.

In a preferred form, a pneumatic pressure operated cylinder is supported by an arm over the work surface to apply a frame to fabric overlying the work surface. A column having a vertical axis supports and is rotatably adjustable to swing the pneumatic cylinder about the axis of the column. The arm is also slidably adjustable relative to the column so as to vary the radius of the arc through which the cylinder can be swung so that the position of the cylinder above the work surface can be adjusted.

In another aspect, the work surface includes means for holding an outer frame and the cylinder has means for holding an inner frame. The means for holding the outer frame can be adjusted on either side of a center along a line which is at 45° to the front of the apparatus.

Preferably, the laser is mounted to the column above the level of the work surface. A shaft extends into the column and is rotatably and slidably adjustable relative to the column. A platform is fixed to the shaft for supporting the laser so that the incidence of the laser light on the fabric can be adjusted by rotating and sliding the shaft in the column.

It is therefore a principal object of the invention to provide an apparatus for applying frames to fabric.

It is another object of the invention to provide such an apparatus which provides for accurate alignment of the fabric with the frame.

It is another object of the invention to provide such an apparatus which can be easily operated.

It is another object of the invention to provide such an apparatus which can be easily adjusted and set up.

It is another object of the invention to provide such an apparatus which can be economically manufactured.

These and other objects of the invention will be apparent from the drawings and from the detailed description.

DESCRIPTION OF THE DRAWINGS

FIG. 2 is an elevation view of an outer frame installed on a work surface of the apparatus of FIG. 1;

FIG. 3 is a sectional view taken along the plane of the line 3—3 of FIG. 2;

FIG. 4 is a sectional view taken along the plane of the line 4—4 of FIG. 3;

FIG. 5 is a sectional view taken along the plane of the line 5—5 of FIG. 1 illustrating an inner frame held by a pressure plate for the apparatus of FIG. 1;

FIG. 6 is a detail view of a portion of FIG. 5;

FIG. 7 is a top elevation view of a support for a laser of the apparatus of FIG. 1; and FIG. 8 is a schematic diagram of an air circuit for the apparatus of FIG. 1.

DETAILED DESCRIPTION OF THE PREFERRED EMBODIMENT

Figure 1:
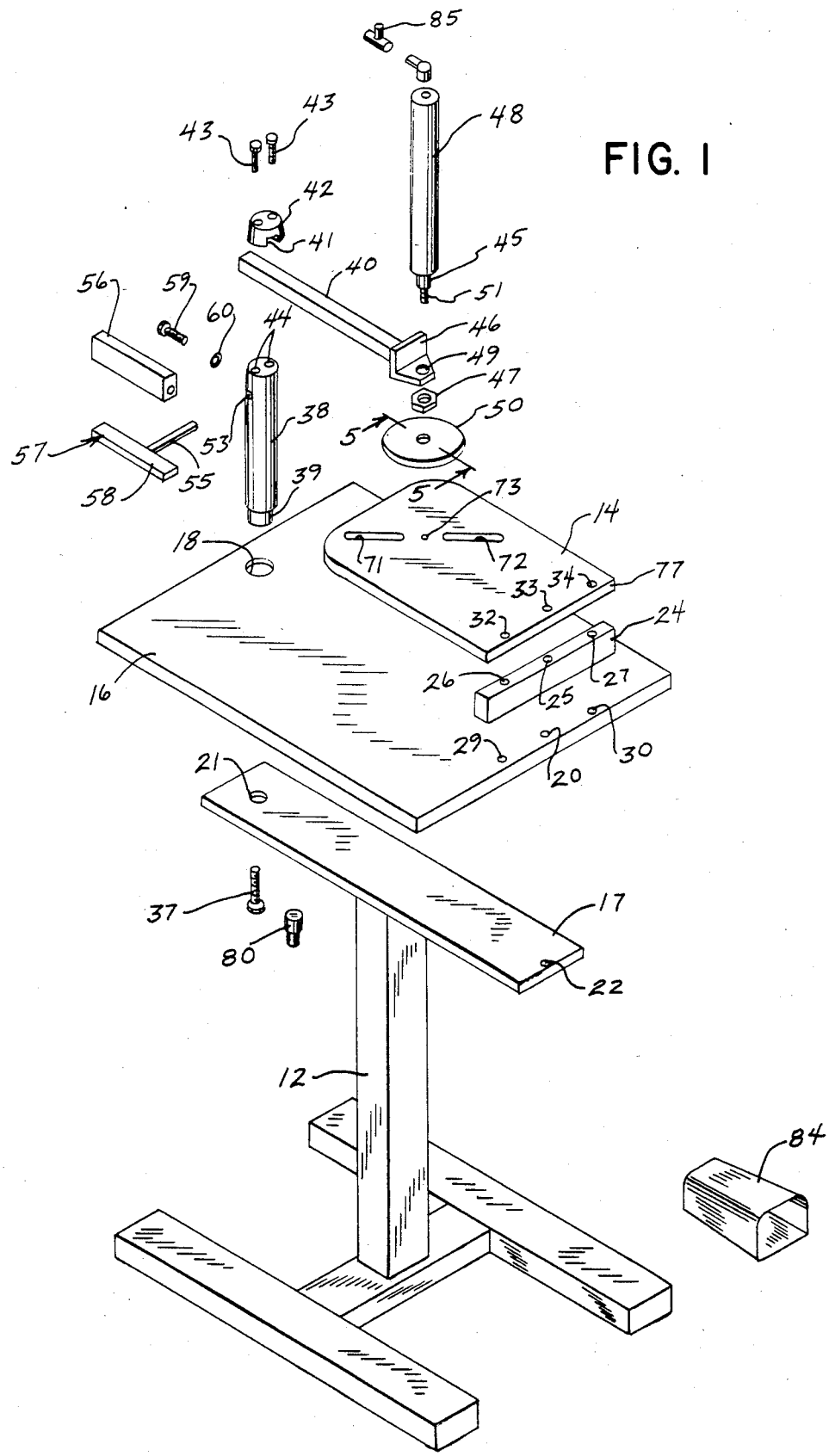
FIG. 1 is an exploded perspective view of an apparatus of the present invention for applying frames to fabric.

FIG. 1 illustrates an apparatus 10 of the present invention. The apparatus 10 includes a stand 12 for supporting a work surface 14 at a comfortable working height. The stand 12 should be made of a rigid structural material such as steel and be stable to support the work surface 14 and other parts as hereinafter described.

A tabletop 16 directly overlies a span 17 which is an integral part of the stand 12. The tabletop 16 has through-bores 18 and 20 which are alignable with through-bores 21 and 22 in the span 17. A spacer bar 24 has a central through-bore 25 alignable with the through-bores 20 and 22 and also has end through-bores 26 and 27 which are alignable with through-bores 29 and 30, respectively, in the tabletop 16. The work surface 14 has three through-bores 32, 33 and 34 which are alignable respectively with the through-bores 26, 25 and 27 in the spacer bar 24. Suitable fasteners (not shown) extend through these through-bores and all the way through the tabletop 16 to secure the work surface 14 to the tabletop 16. The central fastener extends through the through-bores 33, 25, and 20 and through the through-bore 22 in the span 17 to help secure the entire work surface 14, spacer bar 24, tabletop 16 assembly to the stand 12. Thereby, the front of the tabletop 16 is secured to the stand 12.

The rear of the tabletop 16 is secured to the stand 12 using a cylindrical column 38. A lower end 39 of the column 38 is of a reduced diameter to fit within the hole 18 in the tabletop 16. The shoulder provided at the lower end of the column 38 by the reduced diameter abuts the top of the tabletop around the area of the hole 18. The bottom of the column 38 has a threaded bore in it into which a fastener 37 extending up through the hole 21 in the span 17 can be threaded. This connection not only secures the rear of the tabletop 16 to the span 17, but also allows the column 38 to be rotatably adjustable so that it can be turned to any angular orientation before tightening the fastener 37 to fix the column against rotation.

An arm 40 is mounted to the top of the column 38 to be slidably adjustable. The arm 40 is of a rectangular or square cross section to fit within a similarly shaped groove 41 in a cap 42. The cap 42 bears against the arm 40 when screws 43 are tightened into threaded bores 44 in the top of the column 38. Thus, the arm 40 can be slid into and out of the column 38 to adjust the radius of the arc through which the arm can be swung.

The arm 40 also has a support flange 46 at its end nearer to the work surface 14. The flange 46 is designed to mount an air cylinder 48 in a standard way by having a threaded mounting quill 45 of the air cylinder extend through a bore 49 and tightening the quill 45 to the flange 46 with a nut 47. A pressure plate 50 is then screwed onto the threaded end of piston rod 51 of the pneumatic cylinder 48. By rotating the column 38 and sliding the arm 40 into and out of the column 38, the position of the cylinder 48 over the work surface 14 can be adjusted.

Transverse to the direction of the arm 40, a through-bore 53 extends through the column 38. The through-bore 53 slidably receives a shaft 55 of a support 57 for a laser 56. The shaft 55 can be slid into and out of the bore 53 and also rotated therein. Its position is fixed by tightening a screw 59 threaded into a bore in the column 38. The screw 59 bears against the shaft 55 to fix its position. A lead ball 60 may be interposed between the end of the screw 59 and the shaft 55 to avoid marring the shaft 55.

A platform 58 is fixed to the end of the shaft 55. Preferably, the platform 58 is fixed to form an acute angle with the shaft 55 as shown in FIG. 7 to direct the laser beam toward the work surface 14 and allow a broad range of adjustment of the position of incidence of the laser light beam on the work surface 14 as the shaft 55 is slid into and rotated relative to the bore 53.

The laser light source 56 emits a low power, small diameter laser light beam in the visible spectrum. A suitable laser for this purpose is the Metrologic ML811 laser which is commercially available. The laser 56 can be fixed to the platform 58 by double-sided adhesive tape or other suitable means.

As best shown in FIGS. 5 and 6, the pressure plate 50 has a stepped diameter. A lower, smaller diameter 61 is fixed to fit inside a circular hoop type frame 62. The flange formed by a larger diameter 64 abuts the top of the hoop type frame. The smaller diameter 61 has spring loaded detents 65, which are commercially available, around its periphery to press out against the inside of the hoop and thereby hold it on the smaller diameter 61 by friction.

Referring to FIG. 2, a hoop type frame 67 slightly larger than the hoop 62 is held in position on the work surface 14. The smaller hoop 62 fits inside the larger hoop 67 to sandwich the fabric material between the two hoops and hold it taught across the inside area of the smaller hoop. The larger hoop 67 has opposing ears 69 which fit into recesses in blocks 70. The blocks 70 are adjustably slidable in slots 71 and 72 on either side of a center 73 as best shown in FIGS. 3 and 4 by loosening a screw 74 threaded into each block 70. In the desired position, the screws 74 are tightened to clamp against the bottom of the work surface 14 to secure the blocks 70.

The slots 71 and 72 are along a line 75 which is 45° to a line from the center 73 to the axis of the column 38, and is also 45° to the front 77 of the apparatus 10 as shown in FIG. 2. The blocks 70 can thus be adjusted to accommodate a number of different hoop diameters and to position the larger hoop 67 on the work surface. The 45° angle also provides for the proper angular orientation of the fabric in the hoop for most types of automated embroidery machines.

Referring to FIGS. 1 and 8, the air circuitry for the apparatus 10 includes a filter/air pressure regulator 80 connected to a compressed air supply 82. The filter/regulator 80 is connected to a three way foot operated valve 84 which can be operated to admit air to a flow control/check valve 85. The flow control/check valve 85 operates to admit air at a regulable rate to the air cylinder 48 and to allow air from the cylinder 48 to pass freely back through it and to exhaust E when the valve 84 is released. Air pressure lines are not shown in FIG. 1 for clarity.

In use, the fabric is marked where the embroidery or other center is to be and the mark is aligned with the laser beam, which is adjusted to be approximately in the center of the hoop 67 so as to align the fabric with the hoop 67. The valve 84 is then operated and the air cylinder 48 strokes downwardly to place the inner hoop 62 inside the outer hoop 67 and sandwich the fabric between the hoops, stretching the fabric over the inner hoop. The valve 84 is then released and the cylinder rapidly returns upwardly. The hoop 67 is held down by means of the ears 69 and the hoop 62 is left inside the hoop 67 on the work surface 14 because the friction holding it therein is greater than the friction holding it on the pressure plate 50.

Many modifications and variations of the preferred embodiment will be apparent to those of ordinary skill in the art but will still be within the spirit and scope of the invention. For example, the frames need not be round but could be any shape and the laser beam may be adjusted to be incident at a position other than the center of the frame to align the frame and the fabric. Therefore, the invention should not be limited by the scope of the preferred embodiment, but only by the claims which follow.

I claim:

1. The apparatus for applying a frame to fabric comprising:
   a stand;
   a work surface supported by the stand;
   means supported by the stand above the work surface for applying the frame to fabric overlying the work surface; and
   laser means supported by the stand for emitting a beam of visible light incident upon the fabric at a location predetermined to align the fabric with the frame;
   wherein the means for applying the frame to the fabric includes:
   a pneumatic pressure operated cylinder;
   an arm to support the cylinder over the work surface; and
   a column having an axis and supporting the arm above the work surface; and
   wherein the column is rotatably adjustable to swing the pneumatic cylinder about the axis of the column and the arm is slidably adjustable relative to the column so as to vary the radius of the arc through which the cylinder can be swung so that the position of the cylinder above the work surface can be adjusted.

2. The apparatus as in claim 1, wherein the work surface includes means for holding an outer frame, and the cylinder includes means for holding an inner frame and wherein the means for holding the outer frame can be adjusted along a line on either side of a center, said line being at 45° to a front of the apparatus.

3. The apparatus for applying a frame to fabric comprising:
   a stand;
   a work surface supported by the stand;
   means supported by the stand above the work surface for applying the frame to fabric overlying the work surface;
   laser means supported by the stand for emitting a beam of visible light incident upon the fabric at a location predetermined to align the fabric with the frame;
   a column supported by the stand, said column having a vertical axis and extending above the work surface; and
   means for mounting the laser means to the column above the level of the work surface comprising:
   a shaft extending into the column, said shaft being rotatably adjustable relative to said column; and
   a platform fixed to the shaft for supporting the laser means;
   wherein the incidence of the laser light on the fabric can be adjusted by rotating the shaft in the column.

4. The apparatus as in claim 3, wherein the platform forms an acute angle with the shaft.

5. The apparatus as in claim 3, wherein the shaft can be adjustably slid into or out of the column to increase the range of adjustment of the incidence of the laser light beam on the fabric.

6. The apparatus as in claim 3, wherein the means for applying the frame to the fabric includes:
   a pneumatic pressure operated cylinder; and
   an arm supported above the work surface by the column;
   wherein the column is rotatably adjustable to swing the pneumatic cylinder about the axis of the column and the arm is slidably adjustable relative to the column so as to vary the radius of the arc through which the cylinder can be swung so that the position of the cylinder above the work surface can be adjusted.

7. The apparatus as in claim 3, wherein the work surface is spaced above a tabletop.

* * * * *